United States Patent [19]

Hyatt

[11] 4,331,273
[45] May 25, 1982

[54] METHOD OF AND APPARATUS FOR SEVERING A GLASS SHEET

[75] Inventor: Charles J. Hyatt, Cheswick, Pa.
[73] Assignee: PPG Industries, Inc., Pittsburgh, Pa.
[21] Appl. No.: 153,283
[22] Filed: May 27, 1980
[51] Int. Cl.³ .................................................. B26F 3/00
[52] U.S. Cl. .......................................... 225/2; 225/99
[58] Field of Search ............... 198/458, 786; 225/2–4, 225/96.5, 97–99

[56] References Cited

U.S. PATENT DOCUMENTS

| | | |
|---|---|---|
| 594,707 | 11/1897 | Sahlin .................................. 225/98 X |
| 1,810,677 | 6/1931 | Pfeiffer . |
| 2,508,083 | 5/1950 | Winkler ............................. 225/99 X |
| 2,545,667 | 3/1951 | Malaati . |
| 2,745,538 | 5/1956 | Lamb . |
| 2,801,727 | 8/1957 | Malnati . |
| 2,856,060 | 10/1958 | Malnati . |
| 3,072,353 | 1/1963 | Moser . |
| 3,148,761 | 9/1964 | Nieperer et al. . |
| 3,161,155 | 12/1964 | Orlandi . |
| 3,168,056 | 2/1965 | Engels . |
| 3,286,815 | 11/1966 | Shuster et al. . |
| 3,301,550 | 1/1967 | Reinecke . |
| 3,427,910 | 2/1969 | Zempel . |
| 3,491,634 | 1/1970 | Tomshany . |
| 3,807,610 | 4/1974 | Mueller, Jr. ....................... 225/99 X |
| 3,809,207 | 5/1974 | Euverard . |
| 3,838,803 | 10/1974 | Berry . |
| 3,860,232 | 1/1975 | Martin . |
| 3,910,402 | 10/1975 | Dean . |

Primary Examiner—James G. Smith
Attorney, Agent, or Firm—Donald Carl Lepiane

[57] ABSTRACT

Scores between leading and trailing edges of an advancing sheet are opened as the sheet moves over score opening wheels having their rotating axis transverse to the path of the sheet. The wheels are moveable along a path transverse to the sheet path to align the wheels with respective one of the scores. Sections cut from the sheet move in a side by side relation over freely rotating wheels mounted on a bowed shaft to space side edges of the adjacent sections to prevent edge damage.

17 Claims, 4 Drawing Figures

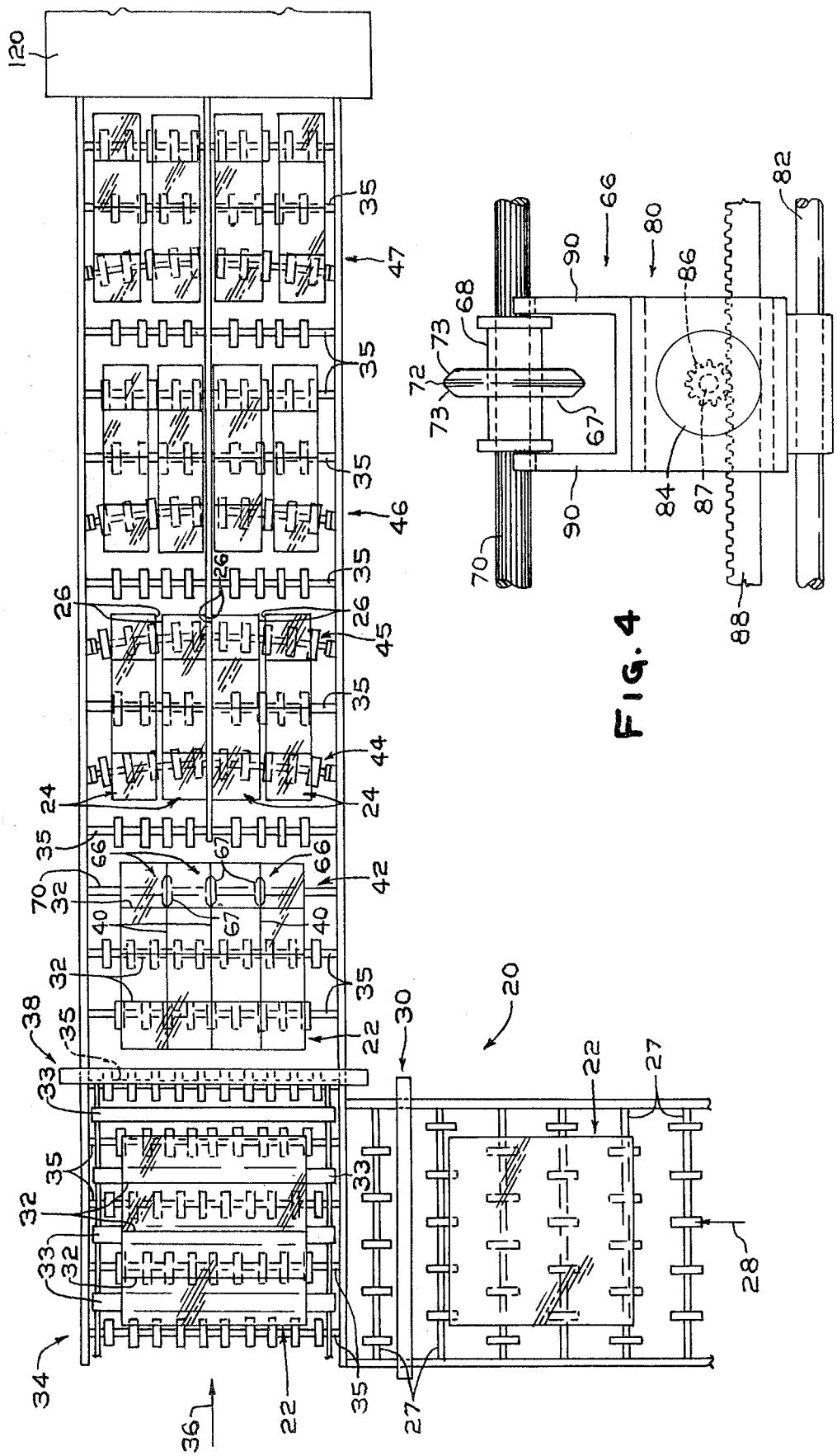

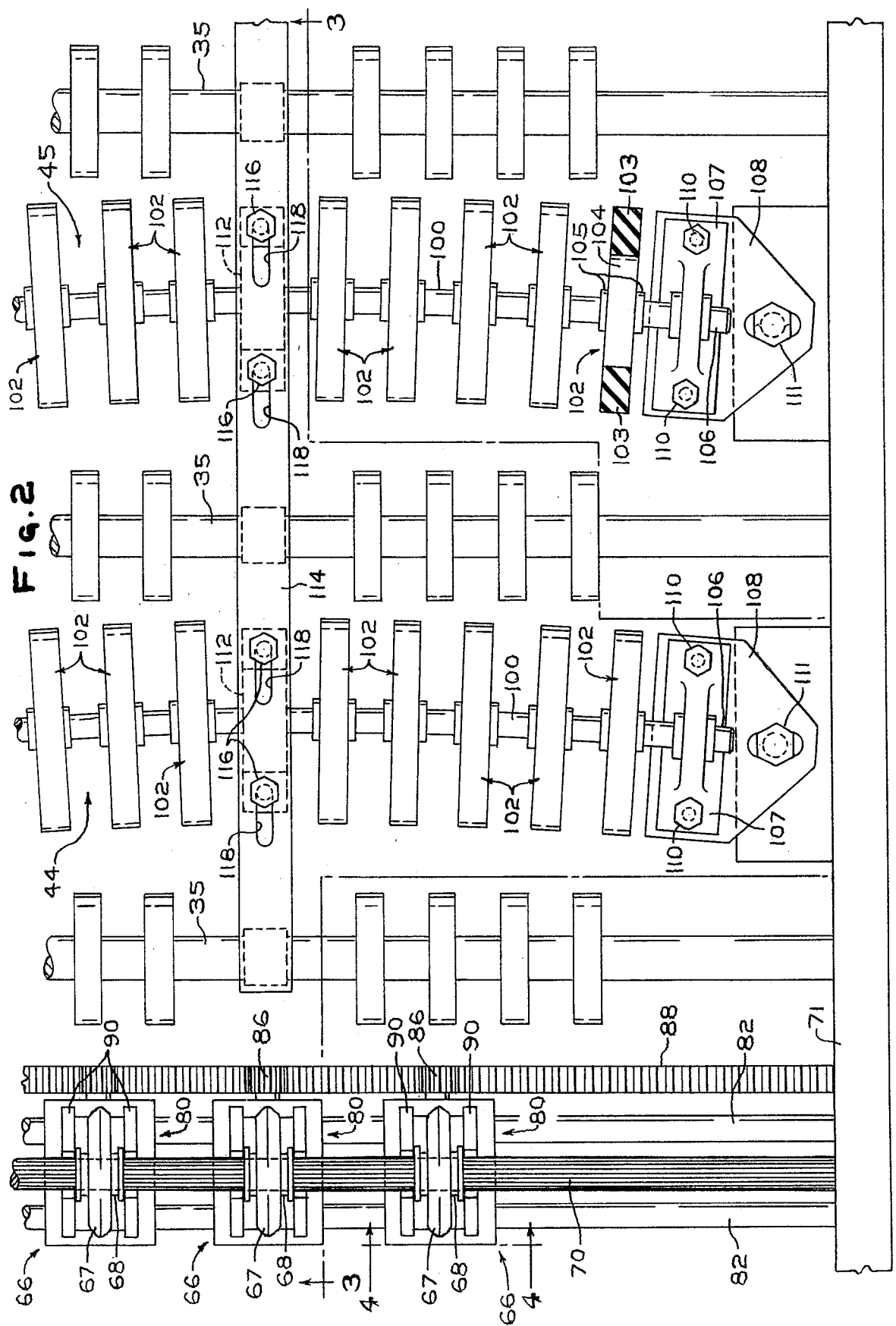

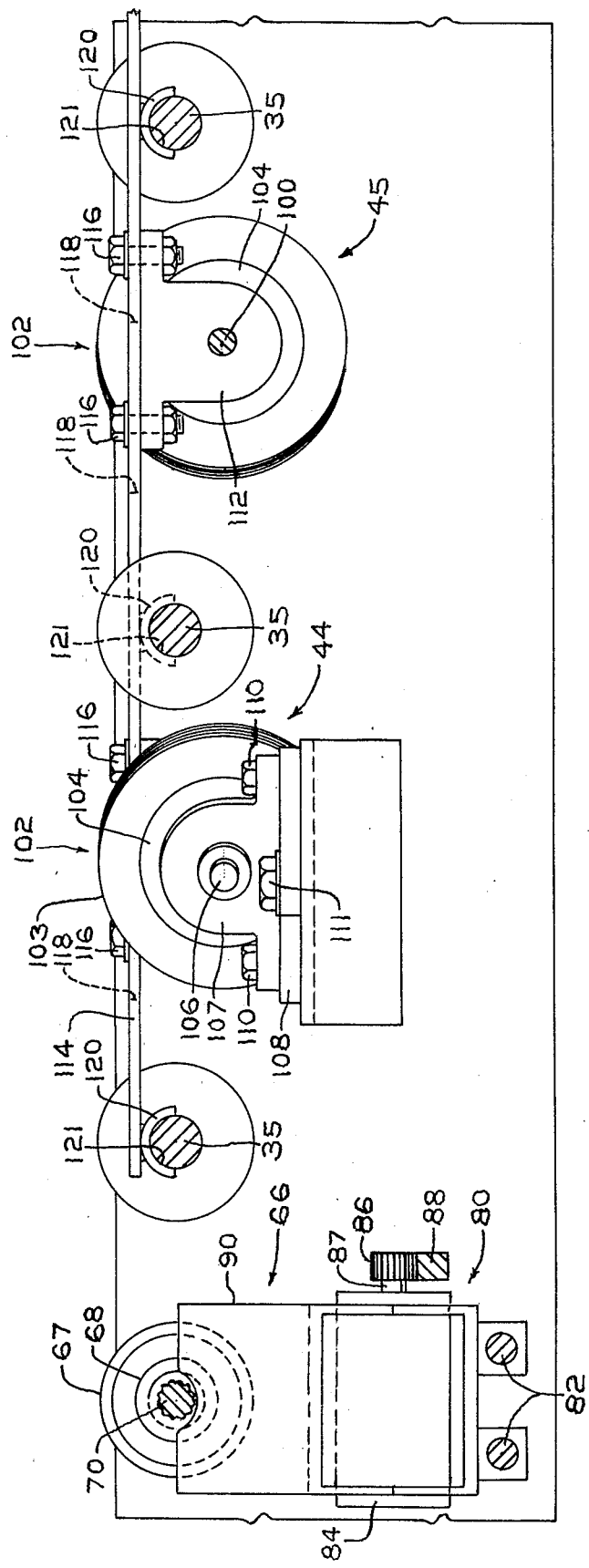

METHOD OF AND APPARATUS FOR SEVERING A GLASS SHEET

BACKGROUND OF THE INVENTION

1. Field of the Invention

This invention relates to a method of and apparatus for severing a sheet and spacing pieces cut therefrom.

2. Discussion of the Technical Problems in the Present Technology

Glass sheets are severed or cut into pieces by scoring the sheets and thereafter opening the scores. When the severing step is practiced on a moving glass sheet, i.e. scores between the leading and trailing edges are opened the side edges of adjacent pieces are separated from one another to prevent edge damage from the edges contacting one another. One such spacing technique is taught in U.S. Pat. No. 3,491,634. In general, U.S. Pat. No. 3,491,634 teaches a conveyor having a plurality of driven cylindrical rolls for advancing a glass sheet through scoring and snapping stations to sever the sheet into glass pieces having their leading edges aligned with one another. Mounted at spaced locations on the conveyor are two driven bowed conveyor rolls. The first bowed roll separates adjacent pieces at the center line of the conveyor and the second bowed roll separates the outer sections from one another. The limitation with the technique taught in U.S. Pat. No. 3,491,634 is that the conveyor rolls and bowed rolls should be driven at the same peripheral speed. If the peripheral speeds are different from one another, the portion of the sheet on the bowed rolls and the portion of the sheet on the straight rolls are subjected to different peripheral speeds which may result in scuffing of the glass surface. Further, moving the sections over two spaced bowed rolls requires extra travel which may result in excess glass edge contact.

U.S. Pat. No. 3,838,803, in general, uses three wheels to apply bending moment forces about a score to sever edge portions from a glass sheet and air jets for moving the severed edge portions from the glass sheet. Although this technique is acceptable for disposing of nonusable glass edge portions, it is not economical to use air jets for precisely controlling side separation of glass pieces as they advance along a movement path. U.S. Pat. No. 3,910,042, in general, teaches the use of individually driven adjustable wheels for vectoring sheets. This technique requires a plurality of rolls each individually driven and is expensive to construct.

As can now be appreciated, it would be advantageous to provide a system for sideward separation of adjacent glass pieces to prevent their edges contacting one another that does not have the limitations of the present available techniques.

SUMMARY OF THE INVENTION

This invention relates to an apparatus for separating side edges of adjacent sections e.g. glass sections which apparatus includes a plurality of spacing rolls selectively mounted between conveyor rolls. The spacing rolls include a flexible shaft having spaced freely rotatable wheels mounted thereon. The sections as they advance over the spacing roller are each moved sideways to space side edges of adjacent sections. Providing freely rotatable wheels on a flexible shaft eliminates the need for adjusting the parallel speed of the separating rolls with the peripheral speed of the conveyor rolls. A mismatch in their peripheral speeds may result in scuffing of the sections due to pulling or dragging of the sections.

This invention also relates to an apparatus for and method of opening scores which method may be practiced on an apparatus including at least one wheel mounted on a bearing, e.g. a splined fitting with the bearing mounted on a shaft e.g. a splined shaft. The shaft is mounted transverse to the conveyor path and the wheel is mounted on a moveable carriage for moving the wheel along the shaft to align the wheel with the score. Using the splined fitting on the splined shaft, the wheel can be moved along the shaft while powering the shaft to selectively align the wheel with the score.

BRIEF DESCRIPTION OF THE DRAWING

FIG. 1 is a plan view of a conveyor system incorporating features of the invention for severing a glass sheet into glass pieces and for sideward separation of adjacent opened cut edges of the advancing glass pieces;

FIG. 2 is a fragmented plan view of the separating section of the conveyor system shown in FIG. 1;

FIG. 3 is a sectioned view taken along lines 3—3 of FIG. 2; and

FIG. 4 is a view taken along lines 4—4 of FIG. 2 of a score opening device incorporating features of the invention.

DESCRIPTION OF THE INVENTION

Shown in FIG. 1 is a conveying system 20 for severing glass sheets 22 into glass sections or pieces 24 and spacing adjacent open cut glass edges 26 from one another. In general, the sheet 22 conveniently advances on conveyor rolls 27 in the direction of the arrow 28 through a first scoring station 30 to impose lateral or cross scores 32 in the sheet 22. The scored glass sheet 22 is advanced by belts 33 onto corner table 34 and thereafter by conveyor rolls 35 in the direction of the arrow 36 through second scoring station 38 to impose longitudinal scores 40 in the glass sheet 22. The invention is not limited to the conveyor rolls 27 and 35, scoring stations 30 and 38 or the corner table 34 and any convenient type, for example, of the type taught in U.S. Pat. Nos. 4,016,969; 4,096,773; 4,109,841 and/or 4,137,803 which teachings are hereby incorporated by reference, may be used in the practice of the invention.

The scored glass sheet 22 advances downstream of the second scoring station 38 on the conveyor rolls 35 through a score opening position 42 and thereafter over spacing rolls 44-47 selectively mounted between conveyor rolls 35 in accordance to the teachings of the invention to separate the side edges 26 of the adjacent advancing glass sections 24.

The scoring opening position 42 includes a score opening device 66 alignable in any convenient manner with a longitudinal score 40. For example, as shown in FIG. 1 there are provided three score opening devices 66 for opening the three longitudinal scores 40 imposed in the glass sheet 22. Referring to FIGS. 2-4, the score opening devices 66 each include a wheel 67 mounted on a spline fitting 68 which is mounted on a spline shaft 70. The shaft 70 may be driven in any convenient manner, e.g. by gearing in housing 71 (see FIG. 2). When the wheel 67 of the device 66 is powered as shown, the peripheral speed of the wheel 67 is preferably the same as the peripheral speed of the driving rolls, e.g. conveyor rolls 35 to prevent dragging the sheet over the rolls which may result in scuffing the sheet surface.

Although the wheels 67 of the score opening devices 66 shown in FIG. 2 are power driven, the invention contemplates freely rotatable wheels mounted on a shaft or a freely rotatable shaft having the wheels 67 conveniently secured thereon.

The wheel 67 of each device 66 is elevated so that the tangent of the sheet and wheel is above the plane of the conveyor rolls 35. In this manner, as the sheet 22 moves through the score opening position 42, the sheet is raised at the score lines to apply bending moment forces about the scores to sever the glass sheet 22. The bending moment forces include the wheel 67 which applies a first directional force, e.g. upward force at the score line and the weight of the glass which applied second opposed directional forces, e.g. downward forces about the score. Referring now to FIG. 4, preferably the periphery of each wheel 67 contacting the sheet has reduced contact area for applying upward point contact forces to the score. This may be accomplished by providing the wheel 67 with sloping sides 73 about a radiused or arcuate peripheral engaging surface 72, e.g a radius of about ⅛ inch (0.32 centimeters).

The score opening devices 66 are preferably adjustable to align their wheel 67 with respective ones of the longitudinal scores 40. The manner of aligning the wheels 67 and scores 40 is not limiting to the invention and one technique is illustrated in FIGS. 2-4. Each of the devices 66 has a platform 80 riding on a pair of guiderails 82 conveniently secured between sides of the conveyor superstructure (not shown). A stepping motor 84 mounted on the platform 80 has a gear wheel 86 secured to its shaft 87. The gear wheel 86 meshes with teeth of rack 88 conveniently secured between sides of the conveyor superstructure. Mounted on the platform 80 are a pair of spaced plates 90 mounted about the spline fitting 68. Conveniently energizing the motor 84 rotates the gear wheel 86 to move along the rack 88 which moves the platform 80 and plates 90. The plates 90 engage the side of the spline fitting 68 to move spline fitting 68 along the spline shaft 70 to align the wheel 67 with its respective one of the longitudinal scores 40.

Referring now to FIGS. 1 and 2, and in particular FIG. 2, the spacing rolls 44-47 incorporating features of the invention, each include a flexible shaft 100 e.g. a ½ inch (1.27 centimeter) steel shaft having a plurality of freely rotatable spaced wheels 102 conveniently mounted thereon. For example, the wheels 102 may include a rubber wheel 103 mounted on a bearing 104 secured in position by collars 105 (as shown in FIG. 2). Ends 106 (one only shown for shafts 44 and 45 in FIGS. 2 and 3) are mounted in self-aligning pillow blocks 107 which is secured to platform 108 by way of nut and bolt assemblies 110. The platform 108 is conveniently secured to the conveyor superstructure by nut and bolt assemblies 111. A center portion of the flexible shaft 100 is mounted in self-aligning pillow block 112 as shown in FIGS. 2 and 3 with the block 112 conveniently detachably secured to a rigid bar 114, e.g. a steel bar by nut and bolt assemblies 116 mounted through bar slots 118 as shown in FIGS. 2 and 3. Bottom surface of the bar 114 as viewed in FIG. 3 has a plurality of spaced ½ collars 120 mounted on a respective shaft 121 of adjacent conveyor rolls 35 as shown in FIG. 3 to prevent displacement of the bar 114 along the movement path 36.

In accordance to the teachings of the invention, rate of side displacement of the sections 24 per distance of travel along the sheet movement path 36 is a function of the downstream bow or radius of the flexible shafts 100, the spacing of the wheels 102 mounted on the shaft; surface area contact, i.e. thickness of the wheels 102; distance between the spacing conveyor rolls 44-47 along the sheet movement path 36 and the number of spacing rolls. Increasing the radius of the flexible shaft 100 while maintaining the remaining parameters constant increases rate of sideward displacement per distance of section travel. Decreasing the spacing of the wheels 102 on the shaft while maintaining the remaining parameters constant increases the rate of side displacement per distance of section travel. Decreasing the thickness of the rolls while maintaining the remaining parameters constant decreases the rate of sideward displacement per distance of section travel. Increasing the spaced distance between the spacing rolls along the sheet movement path while maintaining the remaining parameters constant decreases the rate of sideward displacement per distance of section travel. Decreasing the number of spacing conveying rolls while maintaining the remaining parameters constant, decreases the rate of sideward displacement per distance of section travel. Increasing the speed of the glass sections while maintaining the above parameters constant, decrease spacing time.

As can now be appreciated, the score opening device 66 may be used to open scores in refractory materials other than glass, e.g. glass-ceramics and/or ceramics. Further, the spacing section of the conveying system 20 may be used to space sheets other than glass, e.g. metal sheets, plastic sheets or refractory sheets and for spacing articles such as packages.

DETAILED DESCRIPTION OF THE INVENTION

The invention is practiced on a 3 feet (0.9 meter) square glass sheet 22 having a thickness of 0.070 inch (0.18 centimeter). With reference to FIG. 1, the sheet 22 is advanced along the conveyor rolls 27 in the direction of the arrow 28 through a scoring station 30 of the type taught in U.S. Pat. No. 4,137,802 which imposes three cross scores 32 in the sheet each spaced one foot (0.3 meters) apart. The depth of the scores 32 is approximately 0.006-0.008 inch (0.15-0.20 centimeter) deep. The glass sheet 22 is then advanced by belts 33 onto corner table 34. The sheet is then advanced by conveyor rolls 35 in the direction of the arrow 36 at a speed of about 62.5 feet/minute (18.75 meter/minute). The sheet 22 moves through second scoring station 38 where three longitudinal scores 40 spaced about 1 foot (0.3 meter) apart and having a depth of about 0.056 inch (0.14 centimeter) are imposed in the sheet 22.

The scored sheet 22 advances into the score opening station 42. The score opening station has three score opening devices 66 of the type discussed above. Each of the wheels 67 has a thickness of 1 inch (2.54 centimeter) a diameter of about 4 inches (10.16 centimeter) and an engaging perimeter 72 of about ⅛ inch (0.32 centimeter) radius. The engaging perimeter 72 is raised about ⅛ inch (0.32 centimeter) above the plane of the conveyor rolls 35. The three score opening device 66 are aligned as discussed above with the three longitudinal scores 40. The scored sheet 22 advances over the wheels 67 of the score opening devices 66 which raise the sheet upward to apply an upward force at the score line as downward forces about the score are applied by the weight of the sheet to open the longitudinal scores 40 to provide the glass sections 24 in side by side relationship.

The discussion will now be directed to an arragnement of the spacing rolls 44-47 and conveyor rolls 35 for spacing the sections 24. Mounted downstream of the score opening position 42 are conveyor rolls 35 and spacing rolls 44-47 each on a center to center spacing of about 5 inches (12.7 centimeters) with adjacent roll and generally arranged as shown in FIG. 1. Each of the shafts 100 of the spacing rolls 44-47 have twelve freely rotatable wheels each about 4 inches (12.16 centimeters) in diameter, about 1 inch (2.54 centimeter) thick and on a center to center spacing of about 3.5 inches (8.9 centimeters). The shafts 100 of the spacing rolls 44-47 each have about a 1 inch (2.54 centimeter) bow in a downstream direction.

Returning now to the discussion of the traveling glass section 24, as the sections 24 are moved by the conveying rolls 35 over the spacing rolls 44-47 the glass sections 24 are displaced forward along the movement path and sideward away from the center of the conveyor. The outermost sections move at a sideward speed greater than the innermost section. When the trailing edge of the sections moves downstream of the spacing roll 47, the adjacent cut side edges 26 are spaced about 1 inch (2.54 centimeters) apart.

The sections 24 may be removed from the conveyor and stored, or in the alternative, the cross scores 32 may be opened using the score opening apparatus 120 of the type taught in U.S. Pat. No. 4,088,255, which teachings are hereby incorporated by reference.

As can now be appreciated, the above example of the invention is presented for illustration purposes only and is not limiting to the invention.

What is claimed is:

1. An apparatus for separating side edges of adjacent pieces advancing along a movement path, comprising:
   at least one conveyor roll mounted in the movement path;
   at least one spacing roll mounted in the movement path spaced from said at least one conveyor roll, said at least one spacing roll having a plurality of freely rotatable wheels mounted on a flexible shaft; and
   means acting on said flexible shaft of said at least one spacing roll for adjusting the bow of said shaft relative to the movement path to separate side edges of adjacent pieces to be separated.

2. The apparatus as set forth in claim 1 wherein said at least one conveyor roll includes a plurality of conveyor rolls mounted in the movement path and said at least one spacing roll includes a plurality of spacing rolls mounted in the movement path at selected locations between said conveyor rolls, and further including:
   means for advancing the pieces to be separated on said conveyor rolls and over said spacing rolls.

3. The apparatus as set forth in claim 2, wherein said advancing means includes:
   means for powering said conveyor rolls.

4. The apparatus as set forth in claim 1 or 2 wherein said adjusting means includes:
   a rigid elongated bar secured to said at least one conveyor roll, said elongated bar having its longitudinal axis aligned with the movement path; and
   means engaging portion of said flexible shaft and mounted on said bar for maintaining the bow of said shaft.

5. The apparatus as set forth in claim 4, wherein said maintaining means includes:
   a self-aligning pillow block mounted intermediate ends of said shaft; and
   means for securing said pillow block to said bar; and
   said adjusting means further includes:
   a self-aligning pillow block mounted on end portions of each flexible shaft; and
   means for detachably securing said pillow block mounted on shaft end portions to conveyor structure.

6. The apparatus as set forth in claim 2, further including a score opening position upstream of said spacing rolls, said score opening position comprising:
   at least one wheel;
   means for moving said at least one wheel along a reciprocating path transverse to the movement path.

7. The apparatus as set forth in claim 6, wherein said moving means includes:
   a rack having its longitudinal axis transverse to the movement path;
   a carriage;
   means for mounting said carriage for movement along a reciprocating path transverse to the movement path;
   a motor mounting said carriage; and
   a gear powered by said motor and interacting with said rack for displacing said carriage and at least one wheel along a reciprocating movement path transverse to the movement path.

8. The apparatus as set forth in claim 6, further including means for powering said at least one wheel.

9. The apparatus as set forth in claim 8 wherein said at least one wheel rotates about an axis transverse to the movement path and said at least one wheel has an arcuate peripheral engaging surface.

10. The apparatus as set forth in claim 8 or 9, wherein said powering means includes:
    a spline shaft,
    a spline fitting mounting said splined shaft; and
    said at least one wheel mounted on said spline fitting.

11. The apparatus as set forth in claim 10 wherein said carriage has spaced wall portions about said spline fitting to move said spline fitting over said spline shaft when said motor is energized.

12. The apparatus as set forth in claim 11, further including at least one means for scoring said sheet mounted upstream of said score opening position.

13. An apparatus for moving a score opening wheel into a score opening position to open a score in a sheet advancing along a sheet movement path, comprising:
    a shaft having a longitudinal axis;
    a wheel having a centrally located hole for mounting said wheel on said shaft with the rotating axis of said wheel coincident with the axis of said shaft and the hole of said wheel sized for free movement of said wheel along the shaft in the direction of the axis of said shaft;
    means for mounting said shaft with its longitudinal axis transverse to the movement path and said wheel circumscribing a circular path having a portion of the circular path above and a portion of the circular path below the plane of the sheet movement path;
    a carrier having a pair of spaced uprights for capturing said wheel therebetween; and
    means for moving said carriage along a reciprocating path transverse to the sheet movement path to move said wheel along said shaft into a score opening position.

14. The apparatus as set forth in claim 13 wherein said shaft is a spline shaft; said wheel is mounted on a spline fitting mounted on said spline shaft; and further including:
   means for powering said spline shaft;
   said moving means includes:
      a rack having its longitudinal axis transverse to the sheet movement path;
      a motor mounted on said carriage; and
      means mounting said motor and acting on said rack for displacing said carriage along the path transverse to the sheet movement path and said spline fitting along said spline shaft.

15. The apparatus as set forth in claim 14 wherein said wheel has an arcuate peripheral engaging surface.

16. A method of opening a score imposed in a sheet moving along a horizontal sheet movement path comprising the steps of:
   providing a score opening wheel on a shaft with rotating axis of the wheel coincident with longitudinal axis of the shaft, the shaft having its axis transverse to the movement path and the wheel circumscribing a circular path having a portion of its path above and below horizontal plane of the path;
   displacing the wheel along the shaft transverse to the movement path to align the wheel with the expected path of the score in the sheet; and
   advancing the portion of the sheet having the score over the wheel to open the score as the wheel rotates and the sheet advances along the movement path.

17. The method as set forth in claim 16 further including a step of:
   rotating the wheel while practicing said displacing step.

* * * * *